US005612524A

United States Patent [19]
Sant'Anselmo et al.

[11] Patent Number: 5,612,524
[45] Date of Patent: **\*Mar. 18, 1997**

[54] IDENTIFICATION SYMBOL SYSTEM AND METHOD WITH ORIENTATION MECHANISM

[75] Inventors: Carl Sant'Anselmo, Rancho Palos Verdes; Robert Sant'Anselmo, Canoga Park; David C. Hooper, Ramona, all of Calif.

[73] Assignee: Veritec Inc., Calabasas, Calif.

[ * ] Notice: The term of this patent shall not extend beyond the expiration date of Pat. No. 4,924,078.

[21] Appl. No.: 412,091

[22] Filed: Mar. 28, 1995

Related U.S. Application Data

[63] Continuation of Ser. No. 239,932, May 9, 1994, abandoned, which is a continuation of Ser. No. 97,629, Jul. 27, 1993, abandoned, which is a continuation of Ser. No. 892,409, Jun. 1, 1992, abandoned, which is a continuation of Ser. No. 423,900, Oct. 19, 1989, abandoned, which is a continuation of Ser. No. 125,616, Nov. 25, 1987, Pat. No. 4,924,078.

[51] Int. Cl.⁶ .................................................. G06K 7/14
[52] U.S. Cl. ............................................ 235/494; 235/487
[58] Field of Search .................................. 235/494, 487, 235/460, 461, 462, 463, 466, 454, 464, 383, 436, 456

[56] References Cited

U.S. PATENT DOCUMENTS

| | | |
|---|---|---|
| 2,612,994 | 10/1952 | Woodland . |
| 3,309,668 | 3/1967 | Feissel et al. ............................. 382/30 |
| 3,409,760 | 11/1968 | Hamisch . |
| 3,474,230 | 10/1969 | McMillen . |
| 3,492,660 | 1/1970 | Halverson . |
| 3,529,133 | 9/1970 | Kent et al. . |
| 3,543,007 | 11/1970 | Brinker ...................................... 403/97 |
| 3,594,735 | 7/1971 | Furlong et al. .......................... 235/464 |
| 3,632,995 | 1/1972 | Wilson ..................................... 235/494 |

(List continued on next page.)

FOREIGN PATENT DOCUMENTS

| | | |
|---|---|---|
| 0155982 | 6/1981 | European Pat. Off. . |
| 0081316 | 11/1982 | European Pat. Off. . |

OTHER PUBLICATIONS

Compressed Symbology System Testing Program Report Rockwell International. Apr. 16, 1992.
Tom Swan, Softstrips: A Software Publishing Revolution?, pp. 14–17, Pub. Hayden Book Co., Jan. 1986.
Veritec Inc. pp. 76 and 77, Public Gaming Magazine.
George Haroney, Graphing Quadric Surfaces, Dec. 1986, pp. 215–224.
European Search Report completed by Examiner Taccoen J–F.P.L. on Oct. 21, 1988.
"Cracking Down on Counterfiets" *Newsweek*, Apr. 21, 1986, Judith Jedamus.
*Popular Science*, Apr. 1986, pp. 103–104, 125–126.
"Product Description Document".
"Business Card".
"Letter".
"How Japanese Square Route Could Cut the Cost of Coding" by Roy Garner, May 5, 1987, Colin Linn Financial Times.
Bar Code Symbol Sample.
U.S. Ser. No. 13,026 Name Sant'Anselmo Filed Feb. 1987.

*Primary Examiner*—Tan T. Nguyen

[57] ABSTRACT

The present invention is a symbol 10 that includes a square array 12 of data cells 14 surrounded by a border 30 of orientation and timing data cells. The border 30 can be surrounded by an external data field 18 also including information data cells 20. The orientation and timing for sampling each data cell can be determined from the border 30 or from additional orientation and timing cells in the internal data field 12 or external data field 18. A system 40 and 42 is also included that captures an image of the symbol, determines symbol orientation, decodes the contents of the symbol and outputs the decoded contents to a display or other device. The present invention also includes a device 48 that can produce symbols on a substrate such as a label.

32 Claims, 11 Drawing Sheets

U.S. PATENT DOCUMENTS

| | | | |
|---|---|---|---|
| 3,643,068 | 2/1972 | Mohan et al. . | |
| 3,774,758 | 11/1973 | Sternberg . | |
| 3,792,236 | 2/1974 | Dobras et al. | 366/245 |
| 3,811,033 | 5/1974 | Herrin et al. . | |
| 3,835,297 | 9/1974 | Inoue et al. | 235/487 |
| 3,894,756 | 7/1975 | Ward . | |
| 3,916,160 | 10/1975 | Russo et al. | 235/464 |
| 4,034,210 | 7/1977 | Hill et al. . | |
| 4,138,058 | 2/1979 | Atalla | 235/380 |
| 4,163,570 | 8/1979 | Greenaway | 283/67 |
| 4,180,284 | 12/1979 | Ashley | 283/70 |
| 4,211,918 | 7/1980 | Nyfeler et al. . | |
| 4,213,040 | 7/1980 | Gokey et al. | 235/476 |
| 4,239,261 | 2/1980 | Richardson . | |
| 4,263,504 | 4/1981 | Thomas | 235/454 |
| 4,275,381 | 6/1981 | Siegal | 235/495 |
| 4,286,146 | 8/1981 | Uno et al. | 235/456 |
| 4,489,318 | 12/1984 | Goldman | 340/825.34 |
| 4,534,031 | 8/1985 | Jewer | 369/93 |
| 4,591,704 | 5/1986 | Sherwood et al. . | |
| 4,614,366 | 9/1986 | North et al. . | |
| 4,707,612 | 11/1987 | Martin | 235/454 |
| 4,724,322 | 2/1988 | Knowles et al. | 250/341 |
| 4,736,109 | 4/1988 | Dvorzsak | 235/464 |
| 4,782,221 | 11/1988 | Brass et al. | 235/454 |
| 4,786,792 | 11/1988 | Pierce et al. | 235/454 |
| 4,794,239 | 12/1988 | Allais | 235/462 |
| 4,811,321 | 3/1989 | Enari et al. | 360/49 |
| 4,874,936 | 10/1989 | Chandler et al. | 235/494 |
| 4,910,725 | 3/1990 | Drexler | 235/494 |
| 4,924,078 | 5/1990 | Sant'Anselmo et al. | 235/494 |
| 4,998,010 | 3/1991 | Chandler et al. | 235/464 |
| 5,128,526 | 7/1992 | Yoshida | 235/494 |

DEPTH-OF-FIELD →

IDENTIFICATION SYMBOL SYSTEM AND METHOD WITH ORIENTATION MECHANISM

CROSS-REFERENCES TO RELATED APPLICATIONS

This application is a continuation of application Ser. No. 08/239,932, filed May 9, 1994, now abandoned, which is a continuation, of application Ser. No. 08/097,629, filed Jul. 27, 1993, now abandoned, which is a continuation, of application Ser. No. 07/892,409, filed Jun. 1, 1992, now abandoned, which is a continuation of application Ser. No. 07/423,900, filed Oct. 19, 1989, now abandoned which is a continuation of U.S. application Ser. No. 125,616 filed Nov. 25, 1987, now U.S. Pat. No. 4,924,078. This application is related to U.S. application Ser. No. 306,212 the continuation of 013,026, filed Feb. 10, 1987, entitled Authenticating Pseudo-Random Code and Apparatus by Carl Sant' Anselmo, having U.S. Application Ser. No. 07/306,212 now allowed and U.S. Application Ser. No. 124,274 entitled Symbol Reader by James L. Karney filed Nov. 23, 1987, both incorporated by reference herein.

BACKGROUND OF THE INVENTION

1. Field of the Invention This application is directed to an identification symbol which can be used on items to be identified and, more particularly, to a symbol that includes an orientation border and a method for recognizing and decoding the information represented by the symbol.

2. Description of the Related Art Conventional identification symbols include circular or polar symbols and bar code symbols. Bar code symbols consist of various width bars arranged in a linear orientation. To determine the meaning of a bar code symbol, the symbol must be scanned in a direction substantially parallel with the linear arrangement of the bars. That is, the bar code symbols have a preferred scanning direction and the scanning device must be positioned to scan in the preferred direction. Because the symbol must be properly oriented for scanning, the symbol must be pre-oriented by the symbol identification system user or the scanning apparatus must be capable of scanning in many different directions. Many bar code scanning systems for bar codes on packages and other objects require a quiet zone (a zone of no data lines) in front of the bar code and behind the bar code in the preferred scanning direction. The quiet zone is designed to define an area in which no printing on the package is allowed because printing within the quite zone will render the bar code unreadable. The exterior of the quiet zone constitutes a printing boundary and, on some packages, is defined by a line that can run all the way around the bar code. This line carries or imprints no timing or orientation information and is merely used to define the printing boundary of the symbol. The boundary line is not part of the symbol. The circular identification symbols also suffer from the scanning orientation problem and must be scanned in one direction although the symbol can be in any orientation. Because of the need to scan the conventional symbols in a preferred direction and because many items that include such symbols are randomly oriented when they arrive at a symbol reader, a need has arisen for a symbol that contains high data density and which can be oriented in any direction and still be cost effectively machine readable.

SUMMARY OF THE INVENTION

It is an object of the present invention to provide a symbol that can be detected in any orientation without re-orientation of the image data.

It is another object of the present invention to provide a symbol that does not require a preferred direction of scanning.

It is an additional object of the present invention to provide a symbol that increases information density.

The above objects can be accomplished by a symbol that includes a rectilinear array of data cells surrounded by other data cells forming one or more orientation borders. A system is also included that captures an image of the symbol, determines symbol orientation, decodes the contents of the symbol and outputs the decoded contents to a display or other device.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 20 and 21 illustrate holographic symbols 10, and

DESCRIPTION OF THE PREFERRED EMBODIMENTS

Figure 1:
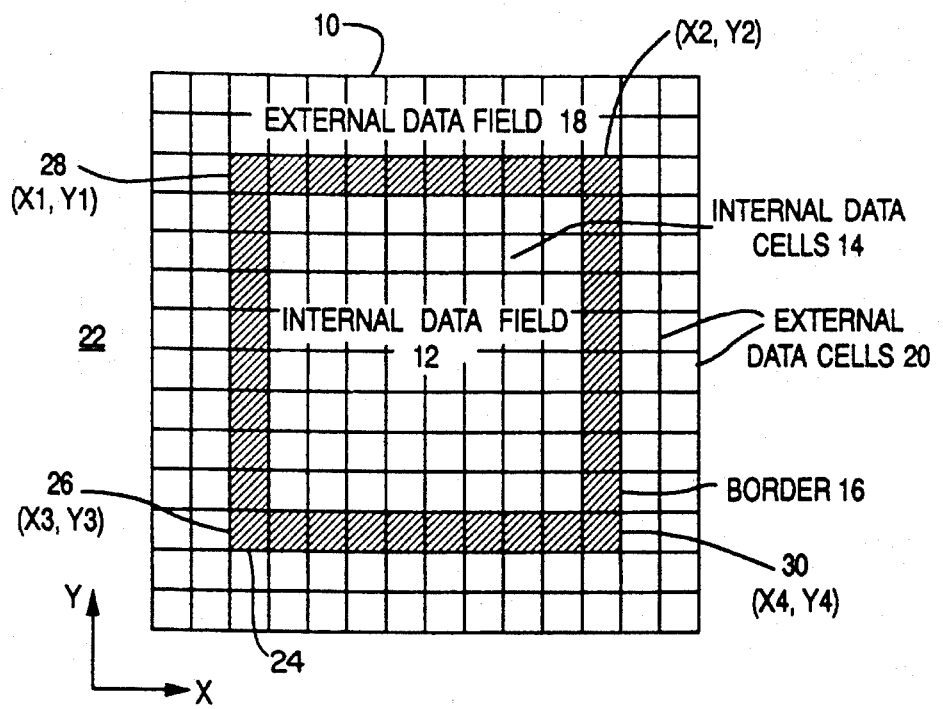
FIG. 1 illustrates a symbol 10 in accordance with the present invention.
Figure 2:
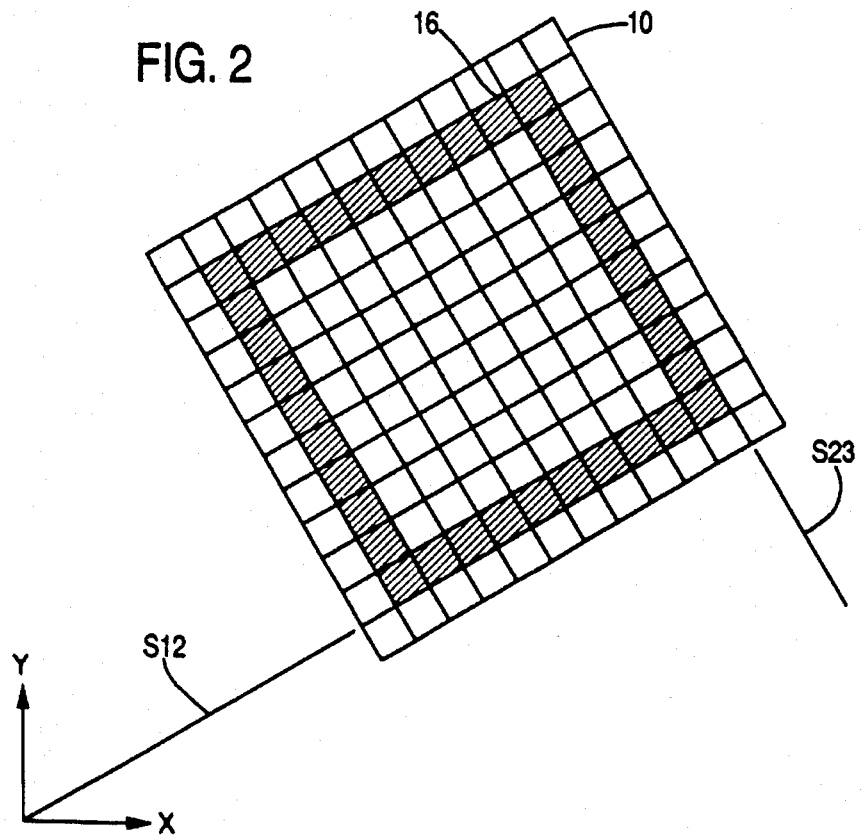
FIG. 2 illustrates a rotated symbol 10.

A symbol 10 in accordance with the present invention includes a rectilinear data field 12 with internal data cells 14 arranged in a matrix, as illustrated in FIG. 1. A matrix 14 of 7×7 data cells using one cell as a parity bit will allow $2^{48}$ different symbols 10. The symbol 10 of FIG. 1 has an internal data field of 64 bits and an external data field of 96 bits allowing $2^{95}$ different symbols. The symbol 10, as can be seen, can have internal and external data fields of a size (N/X/N) which is flexible enough to accommodate any desired number of different and unique symbols. The internal data field 12 is surrounded by an orientation and/or timing data cell border 16 which is used for timing and symbol orientation. The border is typically formed from "on" data cells where an "on" cell can be a light reflecting or light absorbing spot depending on the application. Surrounding the border 16 can be an external data field 18 that includes external data cells 20 which provide addition information on orientation, timing or symbol identification. Surrounding the border 16 or the external data field 18 is a quite zone equivalent to one or more concentric rectilinear rings of "off" data cells surrounding the outermost pattern of "on" cells. The required number of concentric rectilinear rings of the quite zone is effected by the environmental factors of symbol usage. The external data field 18 can act as a quiet zone or can be surrounded by a further quiet zone. Is it possible for the symbol 10 to be as small as is optically readable and as large as desired. The symbol 10 is formed on a substrate such as a sticker or label. The symbol can also be etched, engraved in an object or imaged in a film substrate.

The rectangular border 16 of the symbol can provide useful information which is independent of the information in the symbol itself. The border can be used to calculate the size or equivalently the timing sequence for sampling the data cells, if the number of cells per side of the symbol are known in accordance with the following equations:

$$HCL=(X2-X1)/NHC \quad (1)$$

$$HC=(X2-X1)/HR*NHC \quad (2)$$

$$VCL=(Y3-Y1)/NVC \quad (3)$$

$$VC=(Y3-Y1)/VR*NVC \quad (4)$$

where HCL is horizontal cell length; HC is horizontal correction factor; VCL is vertical cell length; VC is vertical correction factor; X1, Y1 are the coordinates of the lowest X value 24; X2, Y2 are the coordinates of the lowest Y value 26; X3, Y3 equals the coordinates of the highest Y value; X4, Y4 equals the coordinates of the highest X value 30; NHC equals the number of horizontal cells; HR is the horizontal remainder; NVC is the number of vertical cells and VR is the vertical remainder. If the number of data cells per side is not known, the width or thickness of the border 10 can be determined by counting image pixels. If the width of the border 16 in data cells is known, the size of each data cell can be determined by dividing the pixel width by the data cell width. Once the data cell size is known, the data cells can be properly sampled using the border 16 as a timing or sample separation reference.

The orientation of the symbol 10 with respect to a reference system can be determined using known graphics techniques when the location of three corners are known. Knowing the orientation of the symbol 10 provides the orientation of the object to which the symbol 10 is attached. Alternately, using standard slope formulas, the border 16 can provide information defining the rotation or orientation of a symbol 10 in a plane parallel to the image capture plane using the following equation:

$$S12=(Y2-Y1)/(X2-X1) \quad (5)$$

where S12 is the slope relative to a reference axis. The value of S12 can be verified using the following equations:

$$S13=(Y3-Y1)/(X3-X1) \quad (6)$$

$$S12=1/S13 \quad (7)$$

where S13 is the slope of a border line perpendicular to S12.

Figure 3:
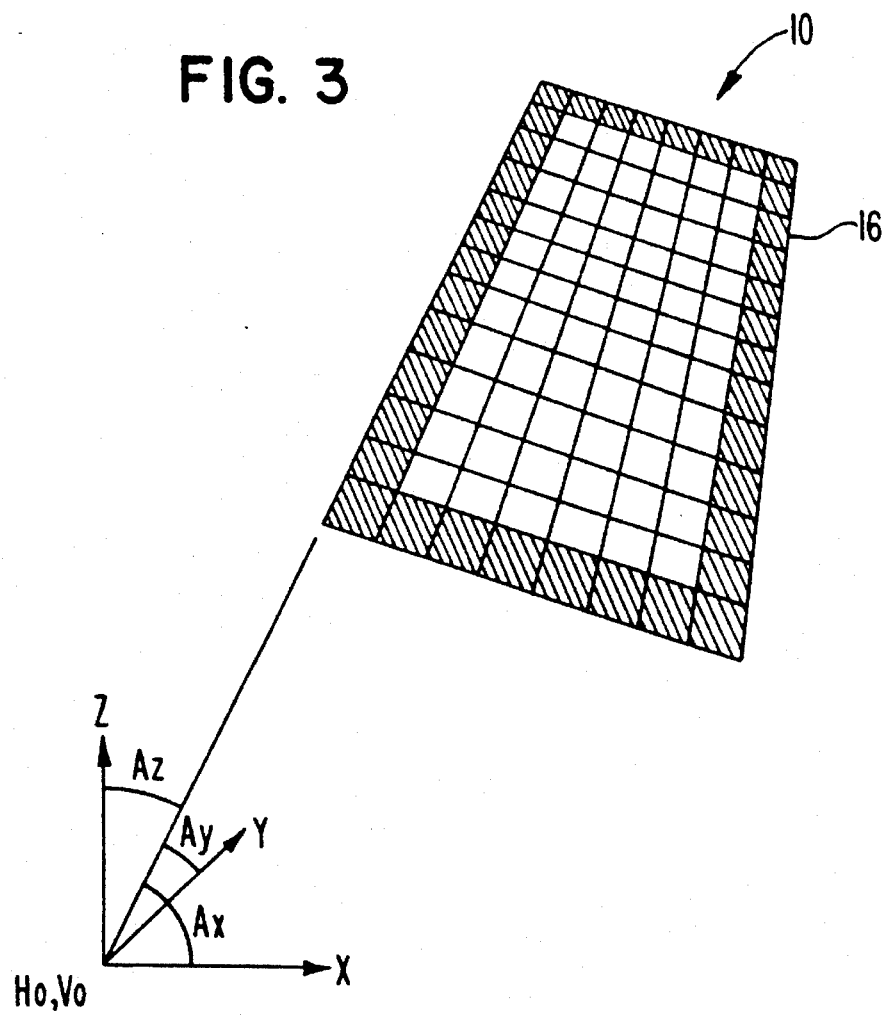
FIG. 3 illustrates a symbol 10 with three-dimensional yaw, pitch and roll orientation.

Because of the rectangular nature of the symbol border 16, well known rotational decomposition algorithms common in the graphics industry can also be used to determine the three- dimensional orientation of the symbol, as illustrated in FIG. 3, where the angles Ax, Ay and Az define the three-dimensional orientation (yaw, pitch and roll) of the symbol 10. With the origin defined by horizontal coordinates $H_o$, $V_o$ the three dimensional orientation of each portion of the symbol can be defined by the angle it forms with respect to reference axes in accordance with the following equations:

$$H=XcosAx+yCosAy+zCOSAz+Ho \quad (8)$$

$$V=XSinAx+YsinAy+zsinAz=Vo \quad (9)$$

Using these formulas along with the slope formulas previously discussed it is possible to determine the location of any data cell in the image. The present invention thereby allows an omni-directional, three-dimensional orientation of capture for the symbol 10. Additional information concerning rotational decomposition can be found in "Graphing Quadric Surfaces" by G. Haroney, Byte Magazine, Dec. 1986, page 217 and "3D Graphics Applications of IATX 86/20," Intel Application Note, Intel Solutions Magazine, July/Aug 1982 incorporated by reference herein. The symbol illustrated in FIG. 3 must be of a known size to allow the known triangulation algorithms to properly operate.

When a symbol 10 of a known size is imaged, the distance to the symbol 10 can also be determined by comparing the width of the largest border 16 with the width or length of a reference border or the largest data cell with a reference data cell. The size ratio along with the known optical dimensions of lenses, etc. in the imaging system can be used in standard optical geometry algorithms to determine the symbol distance.

Figure 4:
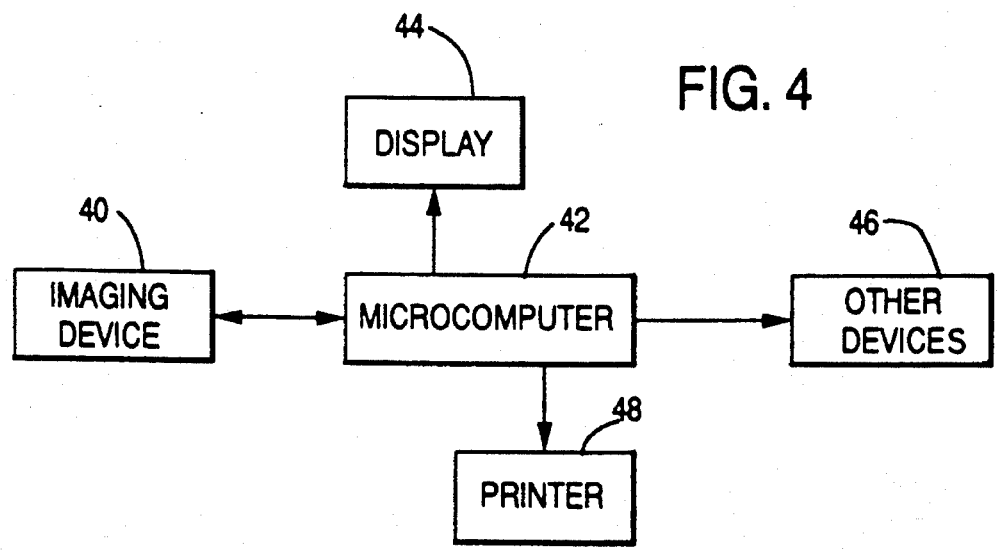
FIG. 4 illustrates the components of a system capable of capturing and decoding a symbol 10 or printing encoded symbols in accordance with the present invention.

FIG. 4 illustrates the components of a system capable of detecting and decoding the symbols 10 of the present invention as well as producing symbols on an appropriate substrate such as adhesive labels. An image capture device 40 is used to capture the symbol image and provide it preferably to a microcomputer 42 such as an IBM AT, another suitable computer or a single chip microcomputer which finds the symbol 10 in the image and decodes it. The microcomputer 42 can output the decoded identification to a display device 44 or to other devices 46 such as a robot control system or an inventory tracking system. The microcomputer 42 can also be used to produce unique encoded symbols as described in U.S. Application Ser. No. 013,026 and print those symbols using a printer 48 such as a laser jet printer using a standard graphics package or software available from Cauzin Systems Incorporated of Waterbury, Conn. For example, each unique product code for items in an inventory can be converted into a bit stream of 47 bits. A party bit is then added to provide a symbol self check feature. Assuming that all data and orientation cell sizes are known, for each bit with a "one" value a data cell can be created in a symbol image in the computer memory. Each byte in the computer memory can represent one pixel at the resolution of the printer and a group of pixels can be defined as a single data cell. The bit values can be used to set all the pixels in the data cell to the same value on the grey scale of a laser jet printer. The computer reads out the contents of the image memory and sends it to the printer which would print each symbol on a different adhesive label, drive a laser etcher creating a symbol in a metal substrate or drive an ink jet printer to fill in appropriate data cells.

The imaging capture 40 can be a two-dimensional symbol reader as described in the Karney application previously mentioned. The image capture device 40 can also be a standard video camera or any other imaging device with sufficient resolution to discern the individual data cells in the symbol 10. The microcomputer 42 in most cases will be capturing and decoding the symbol 10 in real-time. It is preferred that the device 40 provide the image in a two-dimensional form with each pixel of the image represented by a bit in an appropriately sized memory. If an image capture device using a video camera is used an appropriate camera is an NEC TI50-ES available from NEC and a suitable frame grabber interface is DT-2803 available from Data Translation. If a line scan image capture device is used, the line image would have to be assembled in the memory of the computer before symbol recognition processing starts.

Figure 5:
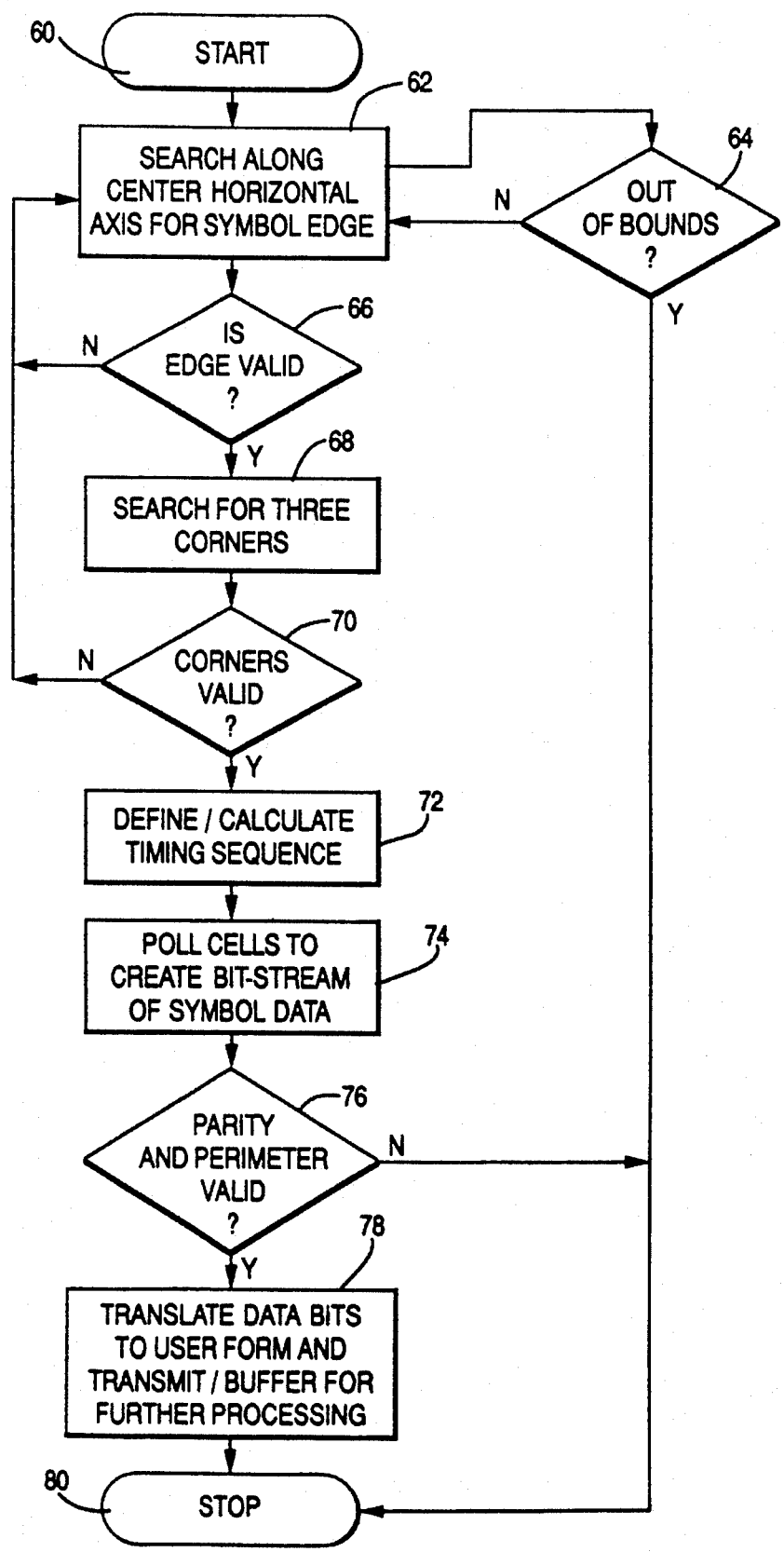
FIG. 5 is a flowchart of the processing performed to decode a symbol in accordance with the present invention.

The data provided by the interface can be enhanced and have noise removed by standard image processing techniques such as a three-by-three bit convolution, or other convolution methods such as the La Placian, Sobel, Prewit and high-pass/low-pass filtering techniques. When the image plane and the symbol plane are in parallel and, as a result, the image captured is two-dimensional, a decoding algorithm as illustrated in FIG. 5 will determine the location of the edges and corners, and output the data represented by the symbol. First the image is searched 62 along a center horizontal axis for a symbol edge. If an edge is not found 64 the process stops. If a valid edge is found 66, the process searches 68 for the three corners of the symbol until valid corners are found 70. Once the corners are located, the timing sequence for sampling the value of each data cell can be determined 72. Once the timing sequence is defined the data cells are polled 74 to create the symbol bit stream which is checked for parity 76 and output or translated 78 into a desired format symbol identification code. Source code which performs the above discussed operations based on an image produced by the camera and frame grabber previously discussed is set forth an Appendix in the parent application incorporated by reference herein. Other more sophisticated image recognition techniques can also be used to determine the symbol identification directly from the captured image.

Figure 6:
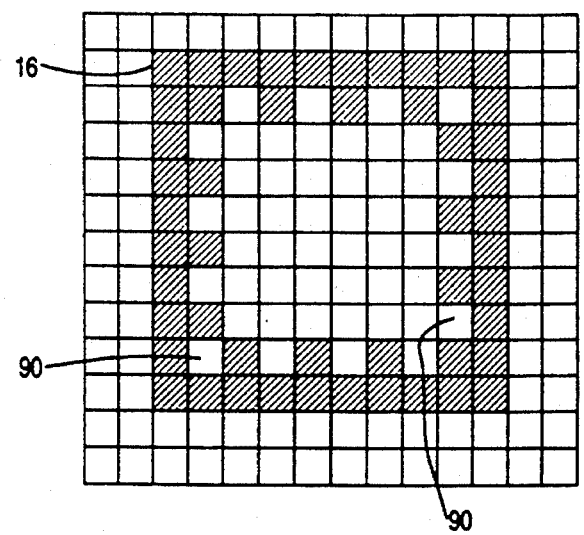
FIGS. 6–10H illustrate additional timing data cells provided by a symbol 10.
Figure 7:
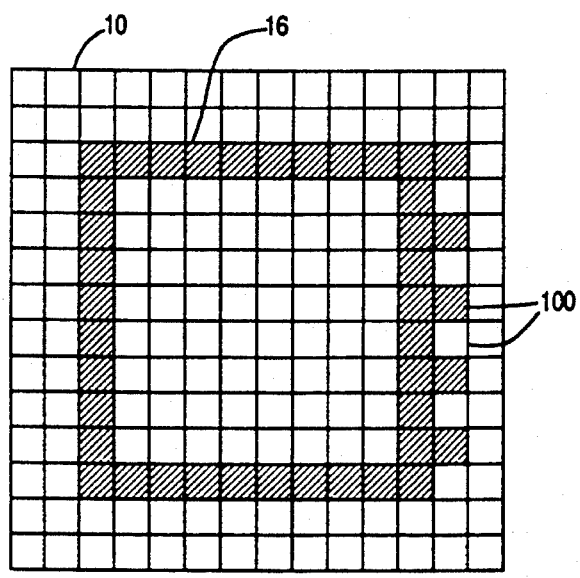

For symbol processing in which the timing used to poll the data cell areas is not part of the internal data structure and is calculated from the corner coordinates and/or from the number of cells per side or width, a symbol as illustrated in FIG. 1 is used. For symbol processing in which essential timing information is not known prior to processing or in which the image is captured in such a way as to be asymmetrical, as depicted in FIG. 3, a symbol as illustrated in FIG. 6 is preferably used, in which the border 16 includes an outermost definition border of all on cells combined with an internal timing data cell border of alternating ON and OFF timing cells 90. The timing sequence for sampling the internal data field cell contents is provided by the reference cells 90 no matter the orientation of the symbol 10. FIG. 7 illustrates a symbol 10 with timing data cells 100 external to the border 16. Timing cells of this type can also be used as additional orientation data cells to help determine the three-dimensional orientation of the symbol.

Figure 8:
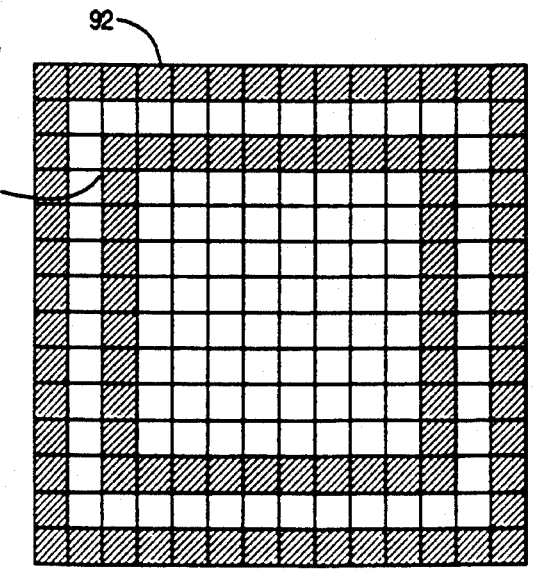

In image capture situations in which there are multiple rectangular shapes within the region of interest a border of several concentric rectilinear data cell rings can be provided as illustrated in FIG. 8. This symbol 10 includes an inner border 16 and an outer border 92 and has numerous applications such as it can be used to provide not only the timing sequence for data cell sampling but can supply additional confirmation of symbol orientation or represent other specific information.

Figure 9:
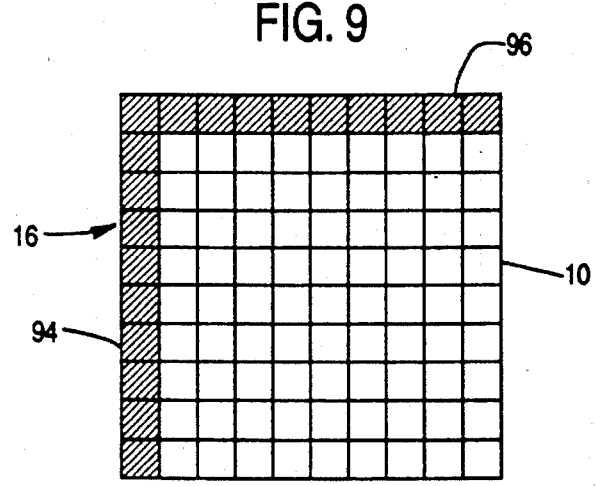

In an environment in which the symbol is strictly aligned with the image plane of the imaging device 40, a symbol as illustrated in FIG. 9 can be provided. This symbol 10 provides a single border 16 on two sides 94 and 96 nearest to the scanning direction and which provides timing information. A key to all the border patterns discussed in this application is that the outermost border 16, not including the quiet zone, be smooth and on at least two sides of the data area. This type of border 16 leads to the fastest image processing of the pixel data in an environment where the exact location of a symbol 10 is not known because the number of edges to be located is at a minimum and the edges are contiguous. In an environment where the exact location of the symbol is known in advance along with the symbol size and data density, the border can be completely eliminated which will produce the fastest possible symbol decoding environment.

Figure 10A:
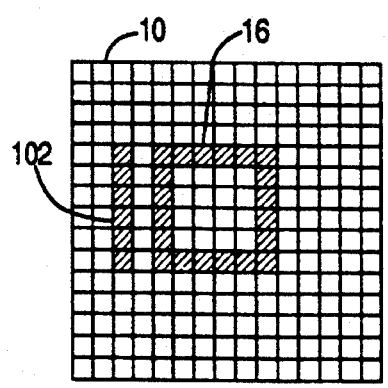
Figure 10B:
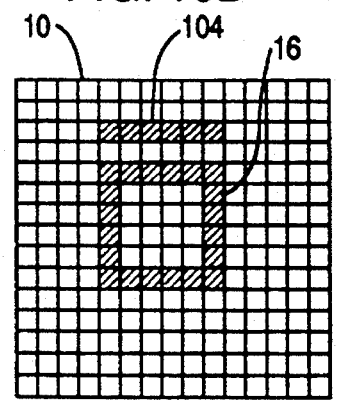
Figure 10C:
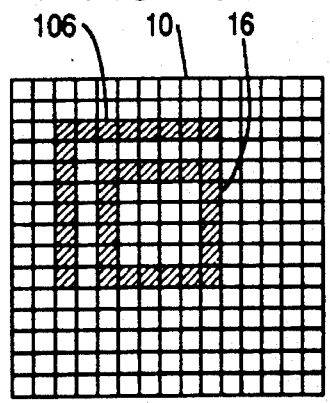
Figure 10D:
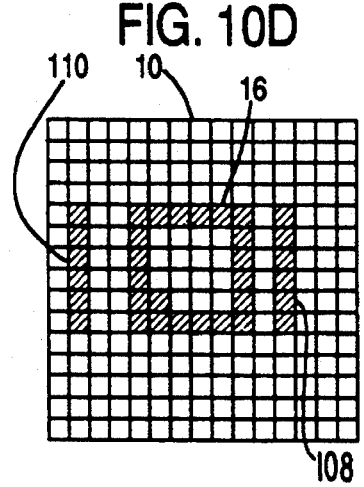
Figure 10E:
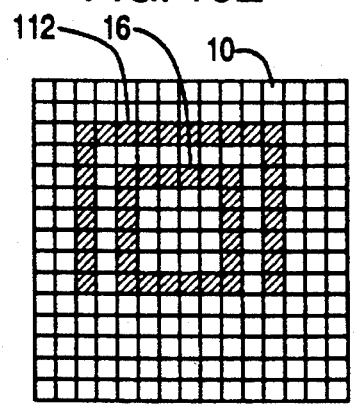
Figure 10F:
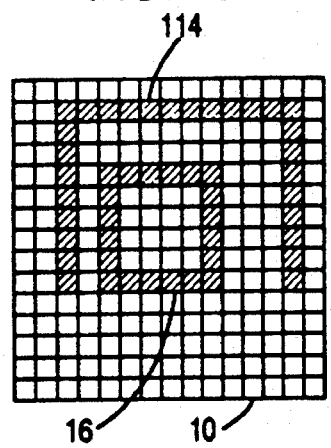
Figure 10G:
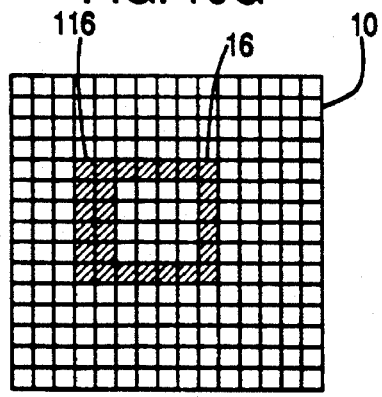
Figure 10H:
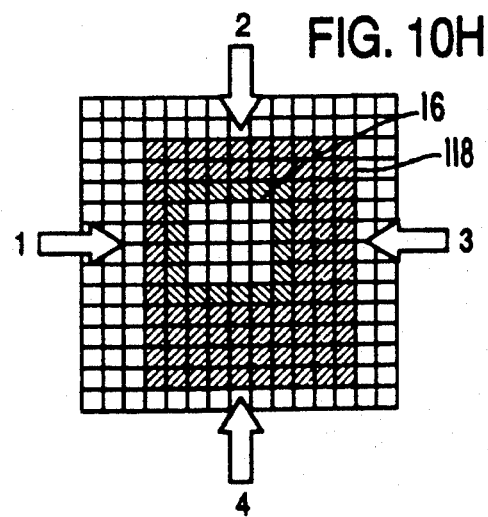

FIGS. 10A–10H illustrate symbols which can provide additional timing or symbolic information. The data cell bar 102 of FIG. 10A provides timing information for scanning from left to right and a mirror image of 10A will provide right to left timing. FIG. 10B provides timing and orientation information for scanning from top to bottom using bar 104, while it's mirror image will provide bottom to top timing. The two sided border 106 of FIG. 10C provides timing and orientation information both vertically and horizontally. FIG. 10D can be used in a system in which the direction the symbol enters the image field is needed. The provision of the unequally spaced bars 108 and 110 allows the direction in which the symbol moves into the image field to be determined by comparing the relationship of the bars in one image frame with the relationship of the bars in a second image frame. The u-shaped data cell line 112 in FIG. 10E allows timing to be determined from three different directions, while FIG. 10F allows determination of direction of travel along with timing information from the line 114. FIG. 10G also allows orientation to be determined by the provision of the unequal width border side 116. FIG. 10H allows scanning in any direction as well as orientation determination using a variable width additional timing border 118.

Figure 11:
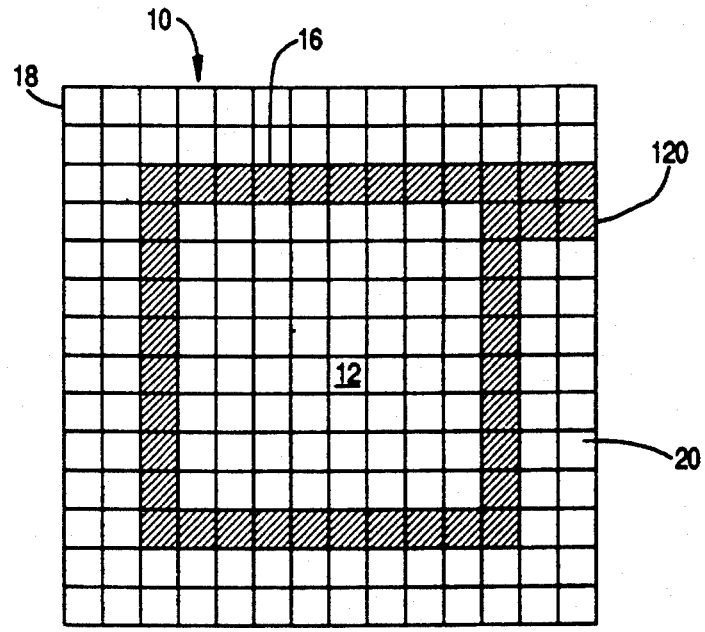
FIGS. 11 and 12 illustrate additional orientation data cells.
Figure 12:
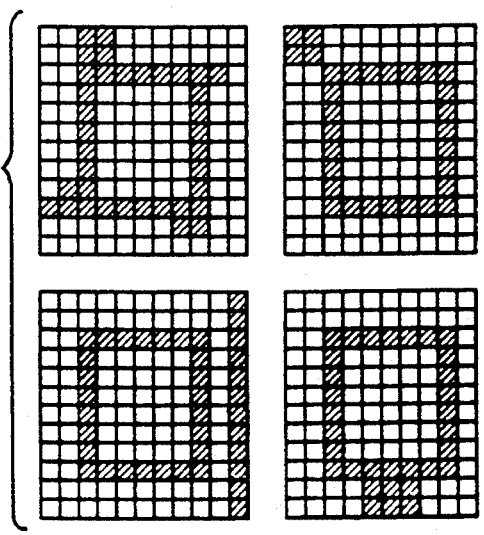

FIG. 11 illustrates another symbol 10 in which orientation can be quickly determined by external orientation cells 120. Once the border is located the computer 42 need only sample data cells 20 in the external data field 18 exterior and adjacent to the border until the orientation cells 120 are found. FIG. 12 illustrates other forms of the external orientation cells 120 which can be used.

It is also possible to determine orientation of a symbol 10 if the internal data field 12 for a particular application has a unique internal data cell pattern for each symbol 10 used in the application. To determine orientation once the data cell values in the internal field 12 are known, the data from the sampled symbol would be compared to all the possible identification symbols in the particular application in each of their possible orientations. A match would identify the symbol and the orientation.

Figure 13:
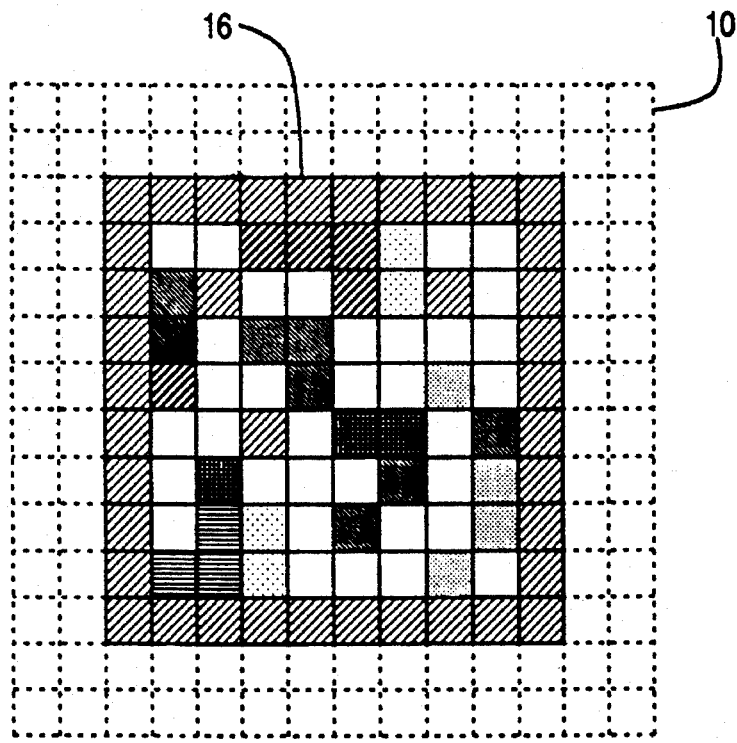
FIG. 13 illustrates gray-scale or color scale data cells.

FIG. 13 represents a symbol 10 in which the data cells are represented as gray shades on a gray scale or using colors on a color scale ranging from ultraviolet to infrared. The use of a gray scale or a color scale in the symbol 10 will allow stacking of data within the symbol 10, thereby further increasing information density. For example the particular color or gray scale level of a data cell may represent a note in a song while the position of the cell in the symbol represents the sequence in which the note is played.

Figure 14:
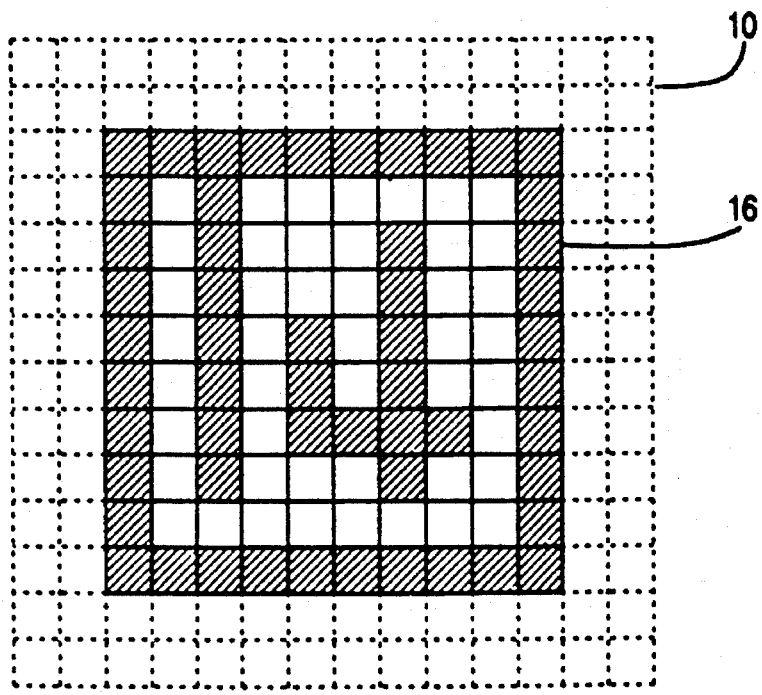
FIG. 14 illustrates a human-readable symbol 10.

FIG. 14 provides a symbol 10 which is not only readable by machine using magnetic ink character recognition as well as optical recognition, but can also be read by a human without additional decoding or interpretation information. Such a symbol can include not only alphabetic and numeric information but Morse code and other well known information formats.

Figure 15:
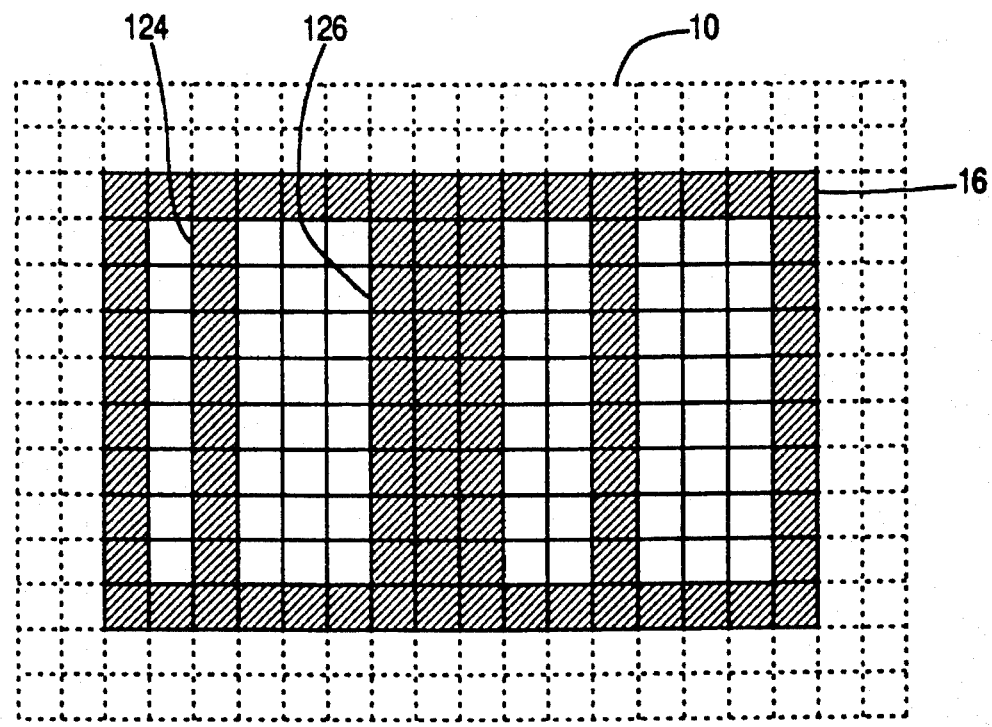
FIGS. 15–17 depict variations on the symbol 10.
Figure 16:
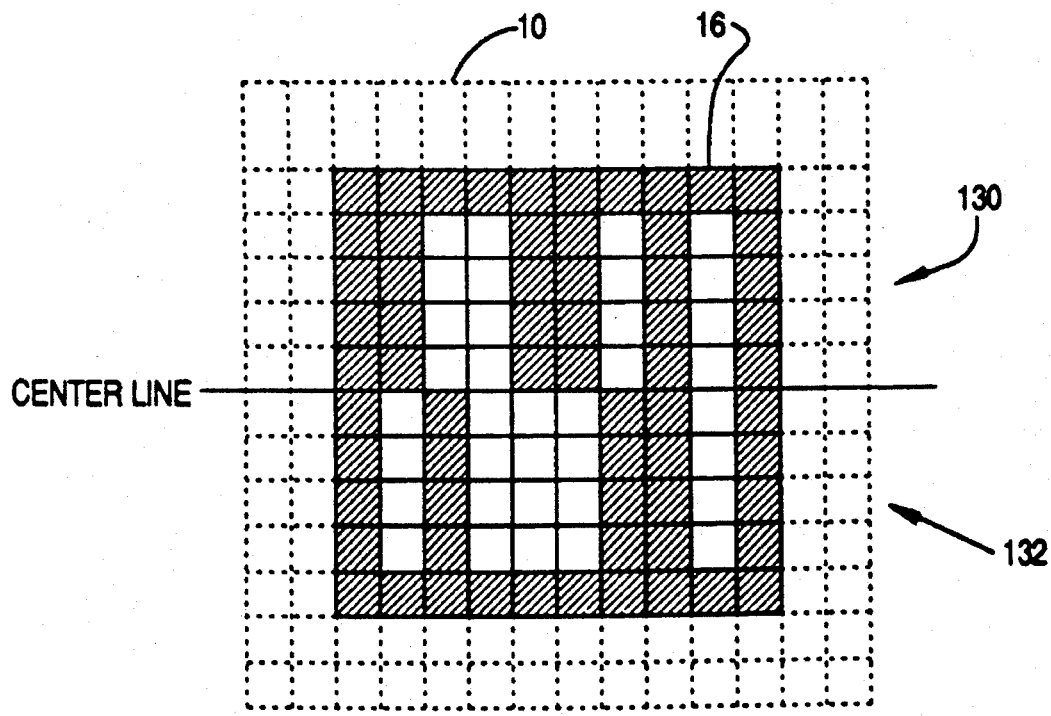

FIG. 15 illustrates a symbol 10 that can be read by a vision system as described herein as well as a bar code reader. This symbol 10 can substitute for a bar code symbol. The symbol 10 represents the varying width columns with vertical regions 124 and 126 where the number of adjacent data cells with the same value vary. The width variations can be made as fine as an image pixel width by defining each data cell as single pixel. FIG. 16 represents a symbol which can function as two adjacent or stacked column codes 130 and 132.

Figure 17:
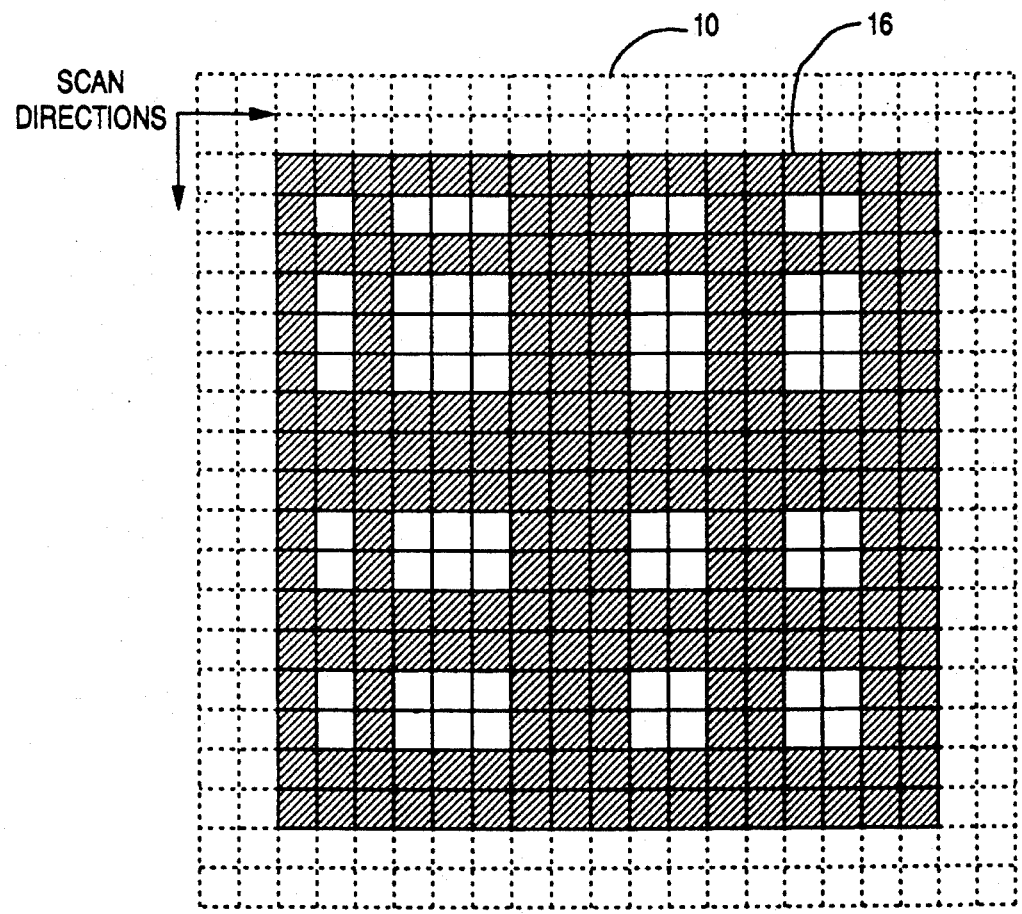

FIG. 17 illustrates a symbol in which the data represented is semi-symmetrical (bi-directional) which will facilitate the decoding process.

Figure 18:
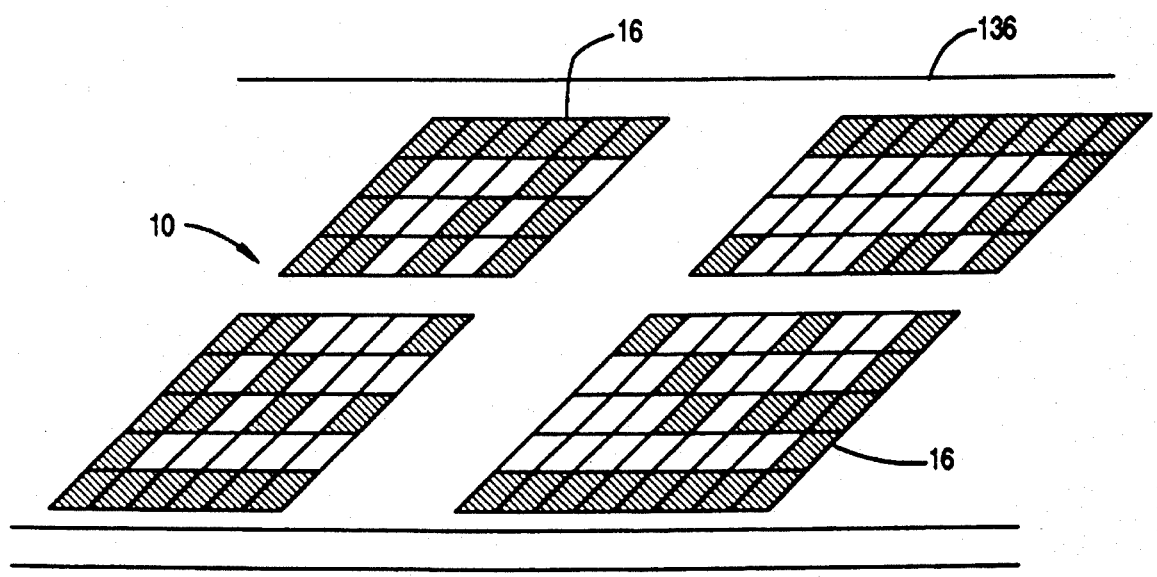
FIGS. 18–20 show dispersed symbols 10.
Figure 19:
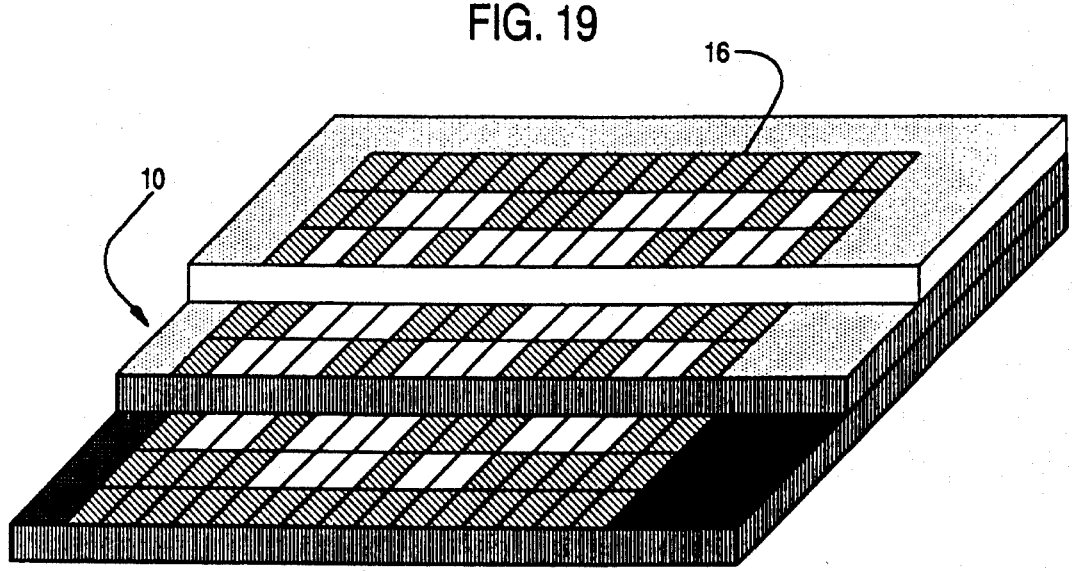
Figure 20:
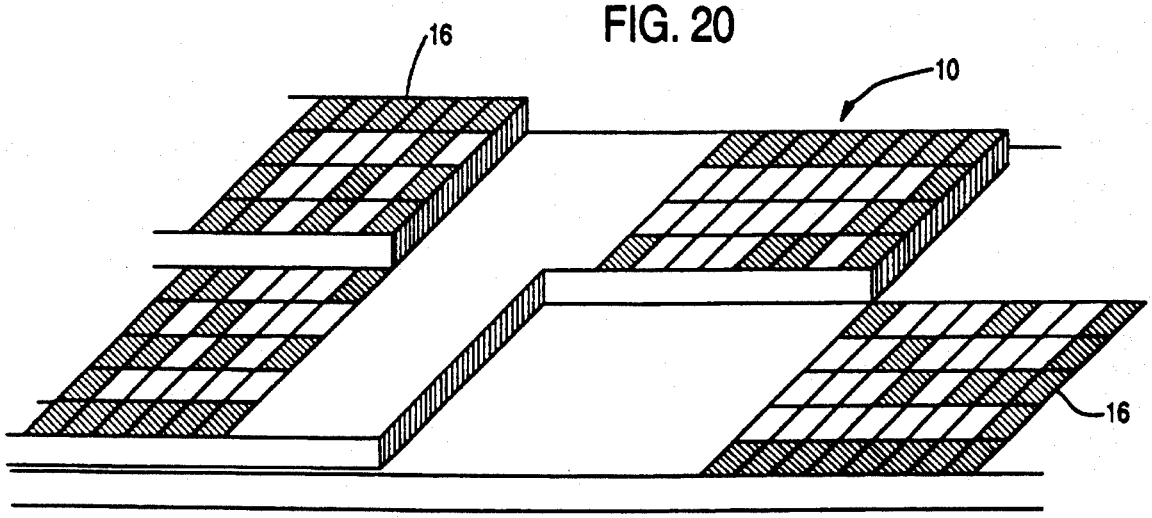

FIG. 18 illustrates how a single symbol can be dispersed within a plane of a substrate 136 or substrates. For example, the symbol can be dispersed on different adjacent parts which allows correct automated assembly to be checked by matching the image symbol to a reference symbol representing correct assembly. Multiple symbols rather than segments of a single symbol can also be used for such automated assembly checking and even for security identification purposes. FIGS. 19 and 20 illustrate symbols dispersed on different planes of an object or objects. Once again multiple complete symbols can be used for the alignment task.

Figure 21:
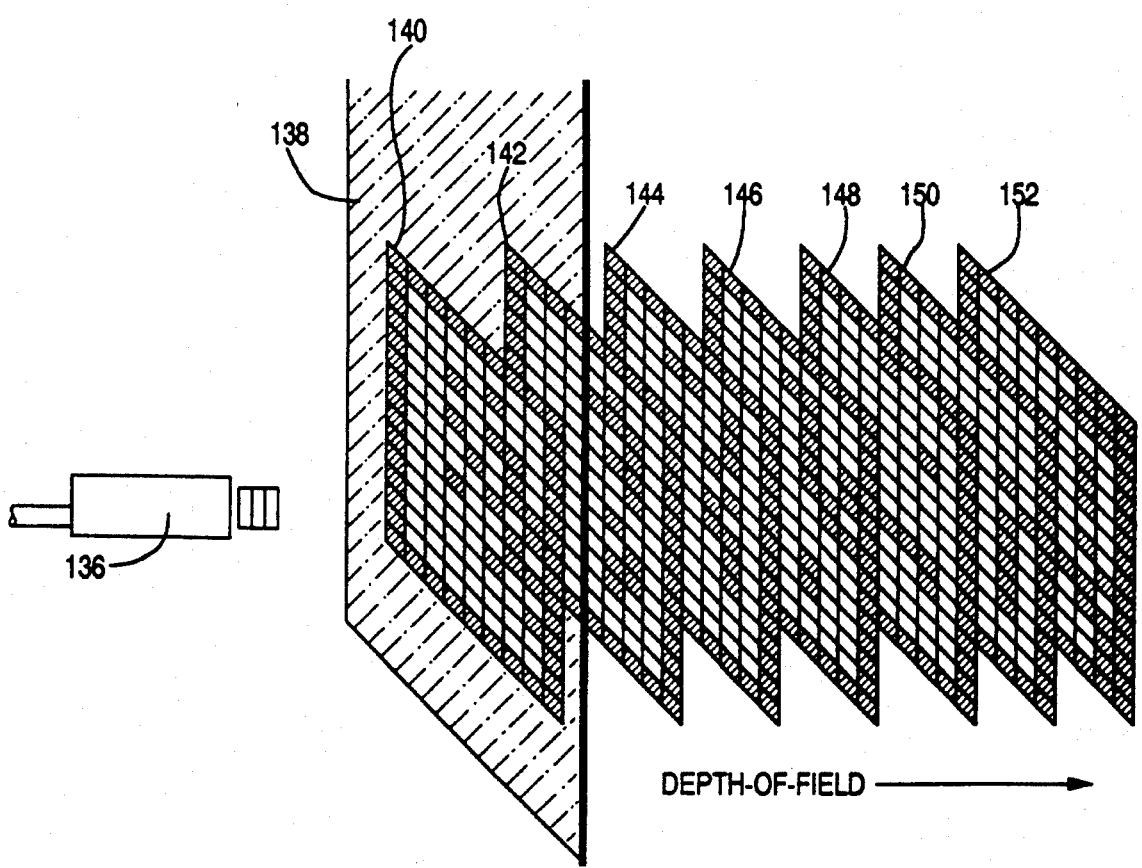
Figure 22:
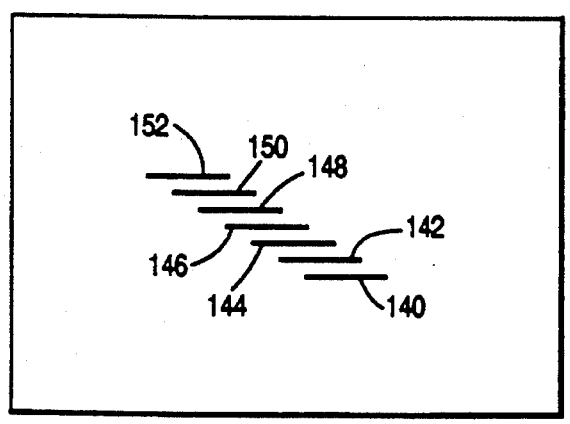
FIG. 22 depicts the code offset.

FIG. 21 illustrates a camera 136 which has a controllable depth of field and focus capability for imaging a film hologram 138 in which symbol images 140-152 are reproduced at varying depths within the holographic image. The creation of holographic images in a film medium with different portions of an image at different focal depths is well known within the holographic imaging art. The various symbol images 140-152 are fixed in the medium using such conventional techniques. The reproduction of those images as visible images, visible for example to a camera 136, is also a well known within the holographic field. To differentiate or capture the visible images 140-152 for decoding, the camera 136 need merely change the focus of the lens so that a different depth of field falls on the imaging plane. FIG. 22 illustrates how these images 140-152 could be offset within the image produced by the holographic imaging system. Offset images at different focal depths can be differentiated in the same way as discussed above when the field of view of the camera 136 is wide enough to encompass all the images.

It is also possible to combine the symbols of the present invention with other symbols such as the bar code symbol, circular symbol, magnetically encoded characters and optically-human readable characters. The symbol as described herein is described as being rectilinear, however, it is possible for a symbol with a border to be any polygonal shape, such as a triangle, octagon or parallelogram depending on the need.

The many features and advantages of the invention are apparent from the detailed specification and, thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What we claim is:

1. An identification symbol system for an object, comprising:
    an identification symbol, comprising:
        a substrate associated with the object;
        a computer readable data matrix data field formed on said substrate and providing symbol information for uniquely identifying the symbol; and
        computer readable orientation means, formed on said substrate and positioned adjacent said field on at least one side, for providing orientation information from a substantially omni-directional three-dimensional orientation of capture; and
    a device for capturing the symbol, identifying the object from the symbol information.

2. A symbol as recited in claim 1, wherein said orientation means further comprises a timing border for data capture timing.

3. A symbol as recited in claim 1, wherein said orientation means surrounds said field.

4. An identification symbol system for an object, comprising:
    an identification symbol, comprising:
        a substrate associated with the object;
        a square data matrix data field formed on said substrate and providing symbol information; and
        an orientation border, formed on said substrate and positioned adjacent said field on at least one side, and providing orientation information from a substantially omni-directional three-dimensional orientation of capture; and
    a device for capturing the symbol, identifying the object from the symbol information.

5. An identification symbol system for an object, comprising:
    an identification symbol, comprising:
        a substrate associated with the object;
        a matrix data cell data field formed on said substrate and providing symbol information; and
        an orientation border, formed on said substrate and positioned adjacent said field on at least one side, said border means comprising a width of a known number of data cells and providing orientation information from a substantially omni-directional three-dimensional orientation of capture; and
    a device for capturing the symbol, identifying the object from the symbol information.

6. A symbol as recited in claim 5, wherein-said data cells are encoded using a gray scale.

7. A symbol as recited in claim 5, wherein said data cells are encoded using a color scale.

8. An identification symbol system for an object, comprising:
    an identification symbol, comprising:
        a substrate associated with the object;
        a data matrix data field formed on said substrate and providing symbol information;
        an orientation border, formed on said substrate and positioned adjacent said field on at least one side, and providing orientation information from a substantially omni-directional three-dimensional orientation of capture; and
        a timing line of data cells adjacent said border; and
    a device for capturing the symbol, identifying the object from the symbol information.

9. A symbol as recited in claim 8, wherein said timing line is on two sides of said border.

10. A symbol as recited in claim 9, wherein said timing line is a different distance from the border on each side.

11. A symbol as recited in claim 8, wherein said timing line is on three sides of said border.

12. A symbol as recited in claim 11, wherein said timing line is a different distance from the border on each side.

13. A symbol as recited in claim 8, wherein said timing line surrounds said border.

14. A symbol as recited in claim 13, wherein said timing line is a different distance from the border on each side.

15. An identification symbol system for an object, comprising:
- an identification symbol, comprising:
  - a substrate associated with the object;
  - a data matrix data field formed on said substrate and providing symbol information;
  - a computer readable orientation border, formed on said substrate and positioned adjacent said field on at least one side, and providing orientation information from a substantially omni-directional three-dimensional orientation of capture; and
  - a timing cell in said field; and
- a device for capturing the symbol, identifying the object from the symbol information.

16. An identification symbol system for an object, comprising:
- an identification symbol, comprising:
  - a substrate associated with the object;
  - a data matrix data field formed on said substrate and providing symbol information;
  - an orientation border, formed on said substrate and positioned adjacent said field on at least one side, and providing orientation information from a substantially omni-directional three-dimensional orientation of capture; and
  - a timing cell outside said border; and
- a device for capturing the symbol, identifying the object from the symbol information.

17. An identification symbol system for an object, comprising:
- an identification symbol, comprising:
  - a substrate associated with the object;
  - a data matrix data field formed on said substrate and providing symbol information;
  - an orientation border formed on said substrate and positioned adjacent said field on at least one side; and
  - an orientation cell formed on said substrate and outside said border means, said border means and said cell for providing symbol orientation information from a substantially omni-directional three-dimensional orientation of capture; and
- a device for capturing the symbol, identifying the object from the symbol information.

18. An identification symbol system for an object, comprising:
- an identification symbol, comprising:
  - a substrate associated with the object;
  - an internal data matrix data field of information data cells representing first information and formed on said substrate;
  - data cell providing orientation and timing on at least one side of said internal data field and formed on said substrate and for providing orientation information from a substantially omni-directional three-dimensional orientation of capture; and
  - an external data field of information data cells representing second information and formed on said substrate; and
- a device for capturing the symbol, identifying the object from the symbol information.

19. An apparatus, comprising:
- image capture means for obtaining image data representing an image field including a symbol comprising a rectilinear data matrix data field of information data cells and an orientation border on at least one side of the data field; and
- decoding means for processing the image data to identify the border, determine orientation and timing information from the border and sample the data cells.

20. An apparatus, comprising:
- means for producing a symbol image of a symbol comprising a rectilinear data matrix data field of information data cells and an orientation border on at least one side of the data field; and
- means for forming the image on a substrate.

21. An identification symbol system for an object, comprising:
- an identification symbol, comprising:
  - a computer readable data matrix data field of individually addressable data cells, formed on said substrate and providing symbol information for uniquely identifying the symbol; and
  - a computer readable orientation border comprising individually addressable data cells, formed on said substrate and providing symbol orientation information from any direction of image capture and positioned adjacent to said field on at least one side; and
- a device for capturing the symbol, identifying the object from the symbol information.

22. An identification symbol system for an object, comprising:
- an identification symbol, comprising:
  - a data field formed on said substrate; and
  - orientation information, formed on said substrate, indicating an orientation of said data field from any direction of image capture; and
- a device for capturing the symbol, identifying the object from the symbol information.

23. An identification symbol system for an object, comprising:
- an identification symbol, comprising:
  - a substrate associated with the object;
  - a data field formed on said substrate; and
  - a border, formed on said substrate and adjacent said data field, and indicating an orientation from any direction of image capture, the border means having first and second sides where each data cell in the border has a same value; and
- a device for capturing the symbol, identifying the object from the symbol information.

24. An identification symbol system for an object, comprising:
- an identification symbol, comprising:
  - a substrate associated with the object;
  - a data field formed on said substrate; and
  - a border, formed on said substrate and adjacent said data field, indicating an orientation from any direction of image capture, the border having first and second sides where each data cell in the border has a same value; and
- a device for capturing the symbol, identifying the object from the symbol information; and
- wherein said border further comprises third and fourth sides where the cells in the third and fourth sides have alternating values.

25. An apparatus, comprising:

image capture means for obtaining image data representing an image field including a symbol comprising a data field of information data cells and orientation means for indicating an orientation of said field; and decoding means for processing the image data to determine orientation and sample the data cells.

26. An apparatus, comprising:

means for producing a symbol image of a symbol comprising a data field of information data cells and orientation means for indicating an orientation of said field; and means for forming the image on a substrate.

27. A decoding process, comprising the steps of:

(a) scanning a symbol comprising a data field of information data cells and orientation means for indicating an orientation of the field;

(b) identifying the location of the data cells; and (c) decoding the symbol from the located data cells.

28. A process as recited in claim 27, wherein step (b) comprises:

(b1) determining an orientation of the symbol; and (b2) determining a timing of the data cells.

29. An identification symbol system for an object, comprising:

an identification symbol, comprising:
a substrate associated with the object;
a data field formed on said substrate; and
an orientation indicator, formed on said substrate, indicating an orientation of said data field from a substantially omni-directional three-dimensional orientation of capture; and a device for capturing the symbol, identifying the object from the symbol information.

30. An identification symbol system for an object, comprising:

an identification symbol, comprising:
a substrate associated with the object;
a computer readable data matrix data field formed on said substrate and providing symbol information for uniquely identifying the symbol; and
computer readable orientation means, formed on said substrate and positioned adjacent said field on at least one side, for providing orientation information from a substantially omni-directional three-dimensional orientation of capture; and a device for capturing the symbol, identifying the object from the symbol information; and wherein said orientation means comprises a solid indicia.

31. An identification symbol system for an object, comprising:

an identification symbol, comprising:
a substrate associated with the object;
a computer readable data matrix data field formed on said substrate and providing symbol information for uniquely identifying the symbol; and
computer readable orientation means, formed on said substrate and positioned adjacent said field on at least one side, for providing orientation information from a substantially omni-directional three-dimensional orientation of capture; and a device for capturing the symbol, identifying the object from the symbol information; and wherein said orientation means comprises a solid border.

32. An identification symbol system for an object, comprising:

an identification symbol, comprising:
a substrate associated with the object;
a computer readable data matrix data field formed on said substrate and providing symbol information for uniquely identifying the symbol; and
computer readable orientation means, formed on said substrate and positioned adjacent said field on at least one side, for providing orientation information from a substantially omni-directional three-dimensional orientation of capture; and a device for capturing the symbol, identifying the object from the symbol information; and wherein said orientation means provides distortion correction information.

* * * * *

UNITED STATES PATENT AND TRADEMARK OFFICE
CERTIFICATE OF CORRECTION

PATENT NO. : 5,612,524

DATED : March 18, 1997

INVENTOR(S) : Sant'Anselmo et al.

It is certified that error appears in the above-indentified patent and that said Letters Patent is hereby corrected as shown below:

```
Column 1, line 29, after "Invention" begin new para-
         graph with --This--;
Column 1, line 34, after "Art" begin new paragraph
         with --Conventional--;
  Column 1, line 52, "quite" should be --quiet--;
Column 2, line 48, "10, and" should be --10; and--;
Column 2, line 58, "data,field" should be --data
         field--;
  Column 3, line 2, "addition" should be
         --additional--;
  Column 3, line 5, "quite" should be --quiet--;
  Column 3, line 8, "quite" should be --quiet--;
  Column 3, line 11, "Is it" should be --It is--;
  Column 3, line 66, "three- dimensional" should
         be --three-dimensional--;
```

UNITED STATES PATENT AND TRADEMARK OFFICE
CERTIFICATE OF CORRECTION

PATENT NO. : 5,612,524
DATED : March 18, 1997
INVENTOR(S) : Sant'Anselmo et al

It is certified that error appears in the above-indentified patent and that said Letters Patent is hereby corrected as shown below:

```
Column 5, line 32, after "forth" insert --in--;
Column 8, line 43, "wherein-said" should be
        --wherein said--;
```

Signed and Sealed this

Sixteenth Day of September, 1997

Attest:

BRUCE LEHMAN

Attesting Officer

Commissioner of Patents and Trademarks

(12) EX PARTE REEXAMINATION CERTIFICATE (6746th)
United States Patent
Sant'Anselmo et al.

(10) Number: US 5,612,524 C1
(45) Certificate Issued: Apr. 7, 2009

(54) IDENTIFICATION SYMBOL SYSTEM AND METHOD WITH ORIENTATION MECHANISM

(75) Inventors: Carl Sant'Anselmo, Rancho Palos Verdes, CA (US); Robert Sant'Anselmo, Canoga Park, CA (US); David C. Hooper, Ramona, CA (US)

(73) Assignee: Techsearch, LLC, Northbrook, IL (US)

Reexamination Request:
No. 90/007,980, Mar. 22, 2006

Reexamination Certificate for:
Patent No.: 5,612,524
Issued: Mar. 18, 1997
Appl. No.: 08/412,091
Filed: Mar. 28, 1995

Certificate of Correction issued Sep. 16, 1997.

Related U.S. Application Data

(63) Continuation of application No. 08/239,932, filed on May 9, 1994, now abandoned, which is a continuation of application No. 08/097,629, filed on Jul. 27, 1993, now abandoned, which is a continuation of application No. 07/892,409, filed on Jun. 1, 1992, now abandoned, which is a continuation of application No. 07/423,900, filed on Oct. 19, 1989, now abandoned, which is a continuation of application No. 07/125,616, filed on Nov. 25, 1987, now Pat. No. 4,924,078.

(51) Int. Cl.
*G06K 7/14* (2006.01)
*G06K 19/06* (2006.01)

(52) U.S. Cl. ............... 235/494; 235/487
(58) Field of Classification Search .......... None
See application file for complete search history.

(56) References Cited

U.S. PATENT DOCUMENTS

| | | | |
|---|---|---|---|
| 2,612,994 A | 10/1952 | Woodland | |
| 3,309,668 A | 3/1967 | Feissel et al. | |
| 3,409,760 A | 11/1968 | Hamisch | |
| 3,474,230 A | 10/1969 | McMillen | |
| 3,492,660 A | 1/1970 | Halverson | |
| 3,529,133 A | 9/1970 | Kent et al. | |
| 3,543,007 A | 11/1970 | Brinker | |
| 3,553,437 A | 1/1971 | Boothroyd | |
| 3,594,735 A | 7/1971 | Furlong et al. | |
| 3,603,728 A | 9/1971 | Arimura | |
| 3,632,993 A | 1/1972 | Acker | |
| 3,632,995 A | 1/1972 | Wilson | |
| 3,643,068 A | 2/1972 | Mohan et al. | |
| 3,660,641 A | 5/1972 | Levasseur | |
| 3,684,867 A | 8/1972 | Acker | |

(Continued)

FOREIGN PATENT DOCUMENTS

| | | |
|---|---|---|
| EP | 0155982 | 6/1981 |
| EP | 0081316 | 11/1982 |
| JP | 60-027074 | 2/1985 |
| JP | 61-065375 | 4/1986 |

OTHER PUBLICATIONS

Adidas America Inc.'s Answers To VCode's and VData's First Set Of Interrogatories (1–5) To Defendants; *VCode Holdings, Inc. et al.* v. *Adidas Salomon AG, et al.;* United States District Court, D. Minnesota, Case No. CV 04–4583 (JMR/FLN).

(Continued)

*Primary Examiner*—Woo H. Choi

(57) ABSTRACT

The present invention is a symbol 10 that includes a square array 12 of data cells 14 surrounded by a border 30 of orientation and timing data cells. The border 30 can be surrounded by an external data field 18 also including information data cells 20. The orientation and timing for sampling each data cell can be determined from the border 30 or from additional orientation and timing cells in the internal data field 12 or external data field 18. A system 40 and 42 is also included that captures an image of the symbol, determines symbol orientation, decodes the contents of the symbol and outputs the decoded contents to a display or other device. The present invention also includes a device 48 that can produce symbols on a substrate such as a label.

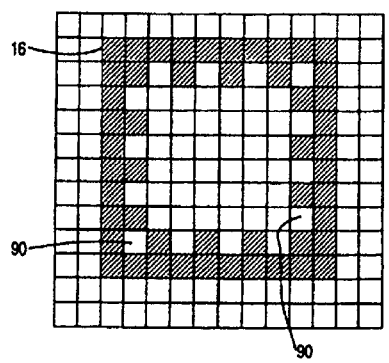
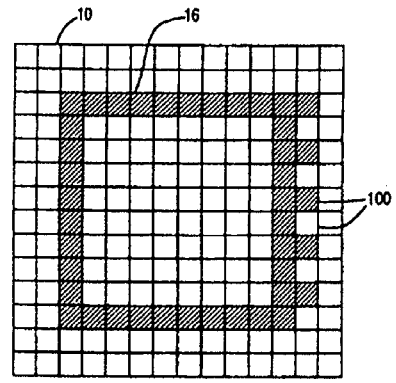

U.S. PATENT DOCUMENTS

| | | | |
|---|---|---|---|
| 3,693,154 A | 9/1972 | Kubo et al. | |
| 3,701,098 A | 10/1972 | Acker | |
| 3,728,677 A | 4/1973 | Munson | |
| 3,774,758 A | 11/1973 | Stemberg | |
| 3,792,236 A | 2/1974 | Dobras et al. | |
| 3,800,282 A | 3/1974 | Acker | |
| 3,801,775 A | 4/1974 | Acker | |
| 3,811,033 A | 5/1974 | Herrin et al. | |
| 3,835,297 A | 9/1974 | Inoue et al. | |
| 3,847,346 A | 11/1974 | Dolch | |
| 3,873,973 A | 3/1975 | Acker | |
| 3,894,756 A | 7/1975 | Ward | |
| 3,916,160 A | 10/1975 | Russo et al. | |
| 4,007,377 A | 2/1977 | Simon et al. | |
| 4,034,210 A | 7/1977 | Hill et al. | |
| 4,138,058 A | 2/1979 | Atalla | |
| 4,163,570 A | 8/1979 | Greenaway | |
| 4,180,284 A | 12/1979 | Ashley | |
| 4,211,918 A | 7/1980 | Nyfeler et al. | |
| 4,213,040 A | 7/1980 | Gokey et al. | |
| 4,239,261 A | 12/1980 | Richardson | |
| 4,263,504 A | 4/1981 | Thomas | |
| 4,275,381 A | 6/1981 | Siegal | |
| 4,286,146 A | 8/1981 | Uno et al. | |
| 4,409,469 A | 10/1983 | Yasuda et al. | |
| 4,424,587 A | 1/1984 | Wevelsiep et al. | |
| 4,488,679 A | 12/1984 | Bockholt et al. | |
| 4,489,318 A | 12/1984 | Goldman | |
| 4,534,031 A | 8/1985 | Jewer | |
| 4,544,064 A | 10/1985 | Felder | |
| 4,591,704 A | 5/1986 | Sherwood et al. | |
| 4,613,942 A | 9/1986 | Chen | |
| 4,614,366 A | 9/1986 | North et al. | |
| 4,634,850 A | 1/1987 | Pierce et al. | |
| 4,707,612 A | 11/1987 | Martin | |
| 4,724,322 A | 2/1988 | Knowles | |
| 4,736,109 A | 4/1988 | Dvorzsak | |
| 4,746,789 A * | 5/1988 | Gieles et al. | 235/462.18 |
| 4,782,221 A | 11/1988 | Brass et al. | |
| 4,786,792 A | 11/1988 | Pierce et al. | |
| 4,794,239 A | 12/1988 | Allais | |
| 4,811,321 A | 3/1989 | Enari et al. | |
| 4,874,936 A | 10/1989 | Chandler et al. | |
| 4,910,725 A | 3/1990 | Drexler | |
| 4,924,078 A | 5/1990 | Sant'Anselmo et al. | |
| 4,998,010 A | 3/1991 | Chandler et al. | |
| 5,128,526 A | 7/1992 | Yoshida | |

OTHER PUBLICATIONS

Affidavit of Michael J. Lavery.
Bar Code Symbol Sample (one page).
Brochure advertising the "Vericode Identification System"; (four pages).
"Business Card".
Cockel, Bryan; "[ ]: When Bar Coding Can't Fit the Real Estate"; Automatic I.D. News; p. 222; Oct. 1986.
Compressed Symbology System Testing Program Report Rockwell International; Apr. 16, 1992.
Dalton, Patrick; "Technologies for Security Environments"; published in Conference Proceedings, Scan–Tech '86 Conference; pp. 42–65; Oct. 15–17, 1986.
Declaration of Donald E. Anderson Pursuant to 28 U.S.C. § 1746.
Declaration of Douglas C. Edgell Pursuant to 28 U.S.C. § 1746.
Declaration of Robert Hall Pursuant to 28 U.S.C. § 1746.
Declaration of Erwin Prifer.
Declaration of Warren Winter Pursuant to 28 U.S.C. § 1746.
Declaration of William F. Behm Pursuant to 28 U.S.C. § 1746.
Defendant Advanced Micro Devices, Inc.'s Responses To Plaintiffs' First Set Of Interrogatories To Defendants (Nos. 1–5); *VCode Holdings, Inc. et al.* v. *Adidas Salomon AG, et al.*, United States District Court, D. Minnesota, Case No. CV 04–4583 (JMR/FLN).
Defendant Boston Scientific Corporation's Answers to Plaintiffs' First Set of Interrogatories (Nos. 1–5); *VCode Holdings, Inc. et al.* v. *Adidas Salomon AG, et al.;* United States District Court, D. Minnesota, Case No. CV 04–4583 (JMR/FLN).
Defendants' Motion For Summary Judgment Of Dismissal Of Plaintiffs' Count One For Patent Infringement On The Basis That Plaintiff's Patent In Suit Is Invalid And For An Award Of Attorney's Fees.
Expert Report of Patrick Drew McDaniel regarding infringement; *VCode Holdings, Inc. et al.* v. *Adidas Salomon AG, et al.;* United States District Court, D. Minnesota, Case No. CV 04–4583 (JMR/FLN).
European Search Report on Oct. 21, 1988.
Garner, Roy; "How Japanese Square Route Could Cut the Cost of Coding"; Colin Linn Financial Times; May 5, 1987.
Haroney, George; Graphing Quadric Surfaces; BYTE; pp. 215–224; Dec. 1986.
Hitachi Global Storage Technologies (Thailand), Ltd.'s Responses to VCodes's and VData's First Set Of Interrogatories (1–5) to Defendants; *VCode Holdings, Inc. et al.* v. *Adidas Salomon AG, et al.;* United States District Court, D. Minnesota, Case No. CV 04–4583 (JMR/FLN).
Jedamus, Judith; "Cracking Down on Counterfiets"; Newsweek; p. 3; Apr. 21, 1986.
King et al.; "Photographic Techniques for Information Storage;" Proceedings of the I.R.E. pp. 1421–1428; Oct. 1953.
"Letter".
Memorandum In Support Of Defendants' Motion For Summary Judgment Of Dismissal Of Plaintiff's Count One For Patent Infringement On The Basis That Plaintiff's Patent In Suit Is Unenforceable And For An Award Of Attorney's Fees, Exhibits A,B and 1–21.
Memorandum In Support Of Defendants' Motion For Summary Judgment Of Dismissal Of Plaintiff's Count One For Patent Infringement On The Basis That Plaintiff's Patent In Suit Is Invalid, Exhibits A and 22–42.
Neubarth, Michael; Popular Science; pp. 103, 104, 125, and 126; Apr. 1986.
"Product Description Document".
Priddy, Dennis G.; "Datacode"; Product Description Brochure; Datacode International, Inc.; Safety Harbor, Florida; Jun. 1989.
Stamps.com Inc.'s Response To First Set of Interrogatories (Nos. 1–5); *VCode Holdings, Inc. et al.* v. *Adidas Salomon AG, et al.;* United States District Court, D. Minnesota, Case No. CV 04–4583 (JMR/FLN).
Swan, Tom; "Softstrips: A Software Publishing Revolution?"; pp. 14–17; Bar Code News; Jan. 1986.
U.S. Appl. No. 13,026, Name Sant'Anselmo, filed Feb. 1987.
"Veritec Inc.," Public Gaming Magazine; pp. 76 and 77; Jul. 1986.

Bhanu, B. et al., "Shape Matching of Two–Dimensional Objects"; IEEE Transactions on Pattern Analysis and Machine Learning; vol. PAMI–6; No. 2; pp. 137–156; Mar. 1984.

Chin, R. et al.; "Model–Based Recognition in Robot Vision"; ACM Computing Surveys; vol. 18; No. 1; pp. 67–108; Mar. 1986.

Davies, A.; "Discrete–Time Synchronization of Digital Data Networks"; IEEE Transactions on Circuits and Systems; vol. CAS–22; No. 7; pp. 610–618; Jul. 1975.

Kalvin et al.; "Two–Dimensional, Model–Based, Boundary Matching Using Footprints"; The International Journal of Robotics Research; vol. 5; No. 4; pp. 38–55; Winter 1986.

Exhibit 4, Brochure advertising the "Vericode Identification System," published before or during Jul. 1986.

Exhibit 5, Patrick Dalton, *Technologies for Security Environments,* published in Conference Proceedings, Scan–Tech '86 Conference, Oct. 15–17, 1986.

Exhibit 6, Bryan Cockel, "[ ]: When Bar Coding Can't Fit the Real Estate," published in *Automatic I.D. News,* Oct. 1986.

Dalton, "Technologies for Security Environments;" Scan–Tech '86 Proceedings Session 3/7; Oct. 15, 16, 17; pp. 42–65; Exhibit 24 introduced on p. 233 of the transcript of the Jul. 28, 2007 deposition of Carl S. Anselmo taken in the *Cognex v. VCode* litigation; Exhibit 43 introduced on p. 150 of the transcript of the Jun. 4, 2007 deposition of Patrick Dalton taken in the *Cognex v. VCode* litigation; Exhibit G from Plaintiff's Invalidity Contentions from the *Cognex v. VCode* litigation.*

Goldstein, "Selling Prevention Counterfeits Spell Cash for Veritec;" Los Angeles Times, Feb. 25, 1986; printed newspaper p. 5B; Exhibit 32 introduced on p. 246 of the transcript of the Jul. 17, 2007 deposition of Robert Anselmo taken in the *Cognex v. VCode* litigation.

Goldstein, "Selling Prevention Counterfeits Spell Cash for Veritec;" Los Angeles Times, Feb. 25, 1986; document text pp. 1–4; Exhibit 33 introduced on p. 246 of the transcript of the Jul. 17, 2007 deposition of Robert Anselmo taken in the *Cognex v. VCode* litigation.

Veriscan 4000 Identification System Operator's Manual; Apr. 27, 1987; 37 pages; Exhibit 3 introduced on p. 17 of the transcript of the Jun. 5, 2007 deposition of Louis S. Leopold taken in the *Cognex v. VCode* litigation.

Vericode Identification System brochure; 4 pages; Exhibit F from Aug. 16, 2007 Plaintiff's Invalidity Contentions from the *Cognex v. VCode* litigation.

Jedamus, "Cracking Down on Counterfeits;" Newsweek; Apr. 21, 1986; p. 3; Exhibit H from Plaintiff's Invalidity Contentions from the *Cognex v. VCode* litigation; Exhibit 61 of Declaration of Kevin Gannon in support of Plaintiff's Motion for Partial Summary Judgment on Count II of its First Supplemental Complaint/Invalidity in the *Cognex v. VCode* litigation.

Cockel, "Magnetic stripes' benefits not seen anywhere else," "Is it fresh? LifeLines tells," "when bar coding can't fit the real estate;" Automatic I.D. News; Oct. 1986; pp. 1 and 18; Exhibit I from Plaintiff's Invalidity Contentions from the *Cognex v. VCode* litigation.

Veritec Inc., Form 10–K Annual report pursuant to section 13 or 15(d) of the Securities Exchange Act of 1934 for the Fiscal Year ended Jun. 30, 1986, Veritec Inc., Sep. 24, 1986; pp. 1, 4, 11–12, 34; Exhibit 7 of Declaration of Kevin Gannon in support of Plaintiff's Motion for Partial Summary Judgment on Count II of its First Supplemental Complaint/Invalidity in the *Cognex v. VCode* litigation.

Public Gaming Magazine "Veritec Inc." Jul. 1986, pp. 76–77; Exhibit 63 of Declaration of Kevin Gannon in support of Plaintiff's Motion for Partial Summary Judgment on Count II of its First Supplement Complaint/Invalidity in the *Cognex v. VCode* litigation.

"Fakebusters: How Technology Spots Counterfeits" Popular Science, Apr. 1986; pp. 102–104, 125–126; Exhibit 64 of Declaration of Kevin Gannon in support of Plaintiff's Motion for Partial Summary Judgment on Count II of its First Supplemental Complaint/Invalidity in the *Cognex v. VCode* litigation.

Haroney; "Graphing Quadric Surfaces: Methods of simulating 3–D graphics on a color display in BASIC"; Byte; Dec. 1986; pp. 215–224; Exhibit 70 of Declaration of Kevin Gannon in support of Plaintiff's Motion for Partial Summary Judgment of Count II of its First Supplement Complaint/Invalidity in the *Cognex v. VCode* litigation.

Shoemaker, Three Dimensional Graphics with the iAPX 86/20 Numeric Data Processor, Jul./Aug. 1982 Solutions, pp. 6–11; Exhibit 23 of Nov. 15, 2007 Declaration of Steven W. Hartsell in support of Defendants' Motion for Partial Summary Judgment on Count II of its First Supplemental Complaint/Invalidity in the *Cognex v. VCode* litigation.

Veritec Press Release in IACC Bulletin, Technology Corner (1 page), Jul. 3, 1985.

Savir et al; The characteristics and decodability of the Universal Product Code symbol; IBM Systems Journal, vol. 14, No. 1; 1975; pp. 16–34; Exhibit 3 of Sep. 28, 2007 Opening Expert Report of David C. Allais in the *Cognex v. VCode* litigation.

Haroney; Graphing Quadric Surfaces; Byte, Dec. 1986, 8 pages.

Shoemaker, Ken; "Three Dimensional Graphics with the iAPX 86/20 Numeric Data Processor," Solutions, Jul./Aug. 1982 (pp. 6–11).

Allais, David C.; Bar Code Symbology: Some Observations on Theory and Practice; Feb. 16, 1982 (43 sheets).

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 6, 7, 11–14, 16–19 and 25 is confirmed.

Claims 1–5, 8–10, 15, 20–24 and 26–32 are cancelled.

\* \* \* \* \*